US008956995B2

(12) United States Patent
Masatsugu et al.

(10) Patent No.: US 8,956,995 B2
(45) Date of Patent: Feb. 17, 2015

(54) CATALYST AND METHOD FOR THERMAL DECOMPOSITION OF ORGANIC SUBSTANCE AND METHOD FOR PRODUCING SUCH CATALYST

(75) Inventors: Mitsuru Masatsugu, Sakai (JP); Toshikatsu Umaba, Sakai (JP); Itsushi Kashimoto, Kusatsu (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 125 days.

(21) Appl. No.: 13/059,314

(22) PCT Filed: Aug. 18, 2009

(86) PCT No.: PCT/JP2009/064689
§ 371 (c)(1),
(2), (4) Date: Feb. 16, 2011

(87) PCT Pub. No.: WO2010/021397
PCT Pub. Date: Feb. 25, 2010

(65) Prior Publication Data
US 2011/0144406 A1 Jun. 16, 2011

(30) Foreign Application Priority Data
Aug. 20, 2008 (JP) .................................. 2008-211286

(51) Int. Cl.
*B01J 21/06* (2006.01)
*B01J 21/08* (2006.01)
(Continued)

(52) U.S. Cl.
CPC ................. *C08J 11/12* (2013.01); *B01J 21/063* (2013.01); *B01J 21/066* (2013.01);
(Continued)

(58) Field of Classification Search
USPC .................................. 585/648, 650, 651, 653
See application file for complete search history.

(56) References Cited

U.S. PATENT DOCUMENTS

| | | | |
|---|---|---|---|
| 4,113,660 A | 9/1978 | Abe et al. | |
| 5,348,987 A | 9/1994 | Kato et al. | |

(Continued)

FOREIGN PATENT DOCUMENTS

| | | |
|---|---|---|
| JP | 59-35026 | 2/1984 |
| JP | 64-45726 | 3/1989 |

(Continued)

OTHER PUBLICATIONS

Eibl et al., Structure of WOx/TiO2 catalysts prepared from hydrous titanium oxide hydroxide: Influence of preparation parameters, 2001, Langmuir, vol. 17, pp. 107-115.*

(Continued)

*Primary Examiner* — In Suk Bullock
*Assistant Examiner* — Youngsul Jeong
(74) *Attorney, Agent, or Firm* — Wenderoth, Lind & Ponack, L.L.P.

(57) ABSTRACT

The invention provides a catalyst for thermal decomposition of an organic substance having the form of spherical granule having a particle diameter of 0.1 to 1.2 mm, a pore volume of 0.1 to 0.3 mL/g, a tap density of 1.05 to 1.4 g/mL, and a wear rate of 2% by weight or less, the catalyst being obtained by mixing and granulating a pulverized product of an inorganic oxide exemplified by titanium oxide with at least one sol selected from a titania sol, a silica sol, an alumina sol, and a zirconia sol to make spherical granules, calcining the spherical granules at a temperature from 400 to 850° C., and sieving the calcined granules.

6 Claims, 2 Drawing Sheets

(51) Int. Cl.
    *B01J 37/04*     (2006.01)
    *B01J 37/08*     (2006.01)
    *C01G 23/047*    (2006.01)
    *C08J 11/12*     (2006.01)
    *B01J 35/00*     (2006.01)
    *B01J 35/02*     (2006.01)
    *B01J 35/10*     (2006.01)
    *B01J 37/00*     (2006.01)
    *B01J 37/03*     (2006.01)
    *C01G 23/08*     (2006.01)
    *C10B 53/07*     (2006.01)
    *C10B 57/06*     (2006.01)
    *F23C 13/08*     (2006.01)
    *F23G 7/07*      (2006.01)
    *C10G 1/08*      (2006.01)
    *C10G 1/10*      (2006.01)
    *C07C 4/04*      (2006.01)

(52) U.S. Cl.
    CPC ........... *B01J 35/0026* (2013.01); *B01J 35/023* (2013.01); *B01J 35/1014* (2013.01); *B01J 35/1038* (2013.01); *B01J 37/0045* (2013.01); *B01J 37/036* (2013.01); *C01G 23/08* (2013.01); *C10B 53/07* (2013.01); *C10B 57/06* (2013.01); *F23C 13/08* (2013.01); *F23G 7/07* (2013.01); *C10G 1/086* (2013.01); *C10G 1/10* (2013.01); *C08J 2323/04* (2013.01); *C01P 2004/32* (2013.01); *C01P 2004/61* (2013.01); *C01P 2006/11* (2013.01); *C01P 2006/12* (2013.01); *C01P 2006/14* (2013.01); *F23G 2900/50202* (2013.01)
    USPC ........... 502/309; 502/300; 502/305; 502/350; 585/648; 585/650; 585/651; 585/653

(56) References Cited

U.S. PATENT DOCUMENTS

| | | | |
|---|---|---|---|
| 2007/0249887 | A1 | 10/2007 | Kitamura et al. |
| 2008/0099323 | A1* | 5/2008 | Kitamura et al. ............... 201/21 |

FOREIGN PATENT DOCUMENTS

| | | | |
|---|---|---|---|
| JP | 5-192583 | | 8/1993 |
| JP | 9-52052 | | 2/1997 |
| JP | 2005-139440 | | 6/2005 |
| JP | 2005-169293 | | 6/2005 |
| JP | 2005-307007 | | 11/2005 |
| JP | 2005-307007 | A * | 11/2005 |
| JP | 2005307007 | A * | 11/2005 |
| WO | 01/05908 | | 1/2001 |
| WO | 2007/122967 | | 11/2007 |

OTHER PUBLICATIONS

Machine translated English document of JP 2005-307007 A.*
International Search Report issued Nov. 24, 2009 in International (PCT) Application No. PCT/JP2009/064689.

* cited by examiner

CATALYST AND METHOD FOR THERMAL DECOMPOSITION OF ORGANIC SUBSTANCE AND METHOD FOR PRODUCING SUCH CATALYST

This application is a U.S. national stage of International Application No. PCT/JP2009/064689 filed Aug. 18, 2009.

TECHNICAL FIELD

The present invention relates to a catalyst and a method for efficient thermal decomposition of an organic substance as well as a method for producing such a catalyst. In particular, the invention relates to a catalyst for thermal decomposition of an organic substance, which catalyst comprises a certain inorganic oxide typified by titanium oxide and has the form of spherical granule having predetermined particle characteristics. The invention further relates to a method for thermal decomposition of an organic substance using such a catalyst as well as a method for producing such a catalyst.

BACKGROUND ART

Recently, various catalysts and methods have been proposed for thermal decomposition of an organic substance such as waste plastic. For example, a method has been proposed in which granules of titanium oxide are used as a catalyst for thermal decomposition of waste plastic. The catalyst is prepared by sintering fine powder of titanium oxide to be a particle diameter of 2 mm or more and processing the granules so as to have an appropriate particle size distribution. According to the method, the granules of titanium oxide and waste plastic strips are heated with stirring in a reaction vessel while a carrier gas is flowed into the vessel, thereby the waste plastic is thermally decomposed, gasified, and exhausted out of the vessel (Patent Literature 1).

However, the method has some problems. That is, the granules of titanium oxide obtained as above are readily worn and pulverized because they have insufficient hardness, and hence, during the thermal decomposition of waste plastic as described above, the pulverized titanium oxide is exhausted out of the vessel accompanied with the gas generated by thermal decomposition of waste plastic. Consequently, efficiency of the thermal decomposition is decreased with the progress of time. Moreover, as the granules of titanium oxide are pulverized, the particle size distribution is changed, and the thermal decomposition efficiency of waste plastic is also decreased.

When a filter is attached to a pipeline for exhausting thermal decomposition gas from the reaction vessel, pulverized titanium oxide can be collected (Patent Literature 2). However, the filter is readily clogged, and thus the thermal decomposition efficiency of waste plastic is decreased with time. On the other hand, even if granules of titanium oxide having large particle diameter are used in order to avoid the pulverization of titanium oxide, the thermal decomposition efficiency of waste plastic becomes poor.

In order to solve such problems, a method in which titanium oxide sol is dried, calcined, crushed, and then subjected to edge processing for satisfying both wear resistance and decomposition performance has been developed (Patent Literature 3). According to the method, the problems described above can be solved, but there is a problem of treatment of fine powder generated by the edge processing. Namely, there is a problem that the fine powder generated is difficult to be recycled.

Patent Literature 1: JP 2005-306697A
Patent Literature 2: JP 2002-363337A
Patent Literature 3: JP 2005-307007A

DISCLOSURE OF THE INVENTION

Technical Problems to be Solved

The invention has been completed to solve the above-described problems involved in the conventional catalysts and methods for thermal decomposition of various organic substances including waste plastic by heating them in the presence of the catalyst.

Therefore, it is an object of the invention to provide a catalyst for thermal decomposition of an organic substance, which has remarkably high thermal decomposition efficiency of an organic substance with minimal loss of the catalyst due to pulverization, and a method for thermal decomposition of an organic substance using such a catalyst, and furthermore, a method for producing such a catalyst for thermal decomposition of an organic substance.

Means to Solve the Problems

The invention provides a catalyst for thermal decomposition of an organic substance, which comprises at least one inorganic oxide selected from titanium oxide, a titanium/niobium composite oxide, a titanium/silicon composite oxide, a composite oxide of at least one element selected from silicon and tungsten with titanium, a composite oxide of at least one element selected from silicon and molybdenum with titanium, a titanium/aluminum composite oxide, zirconium oxide, a titanium/zirconium composite oxide, and a titanium-containing perovskite compound, and has the form of spherical granule having a particle diameter of 0.1 to 1.2 mm, a pore volume of 0.1 to 0.3 mL/g, a tap density of 1.05 to 1.4 g/mL, and a wear rate of 2% by weight or less.

Hereinafter, in the specification of the invention, the at least one inorganic oxide selected from titanium oxide, a titanium/niobium composite oxide, a titanium/silicon composite oxide, a composite oxide of at least one element selected from silicon and tungsten with titanium, a composite oxide of at least one element selected from silicon and molybdenum with titanium, a titanium/aluminum composite oxide, zirconium oxide, a titanium/zirconium composite oxide, and a titanium-containing perovskite compound is simply referred to as "(the) inorganic oxide" unless otherwise noted.

Preferably the catalyst for thermal decomposition of an organic substance of the invention comprises the at least one inorganic oxide, and has the form of spherical granule having a particle diameter of 0.1 to 1.2 mm, a pore volume of 0.1 to 0.3 mL/g, a tap density of 1.05 to 1.4 g/mL, and a wear rate of 2% by weight or less, wherein the spherical granule of the inorganic oxide is obtained by mixing and granulating a pulverized product of the inorganic oxide with at least one sol selected from a titania sol, a silica sol, an alumina sol, and a zirconia sol to make spherical granules, calcining the spherical granules at a temperature from 400 to 850° C., and sieving the calcined granules.

More preferably the catalyst for thermal decomposition of an organic substance of the invention is a catalyst for thermal decomposition and gasification of an organic substance by heating the organic substance with the catalyst with stirring, which catalyst comprises the at least one inorganic oxide, and has the form of spherical granule having a particle diameter of 0.1 to 1.2 mm, a pore volume of 0.1 to 0.3 mL/g, a tap density of 1.05 to 1.4 g/mL, and a wear rate of 2% by weight or less, wherein the spherical granule of the inorganic oxide is obtained by mixing and granulating a pulverized product of the inorganic oxide with at least one sol selected from a titania sol, a silica sol, an alumina sol, and a zirconia sol to make spherical granules, calcining the spherical granules at a temperature from 400 to 850° C., and sieving the calcined granules.

The invention also provides a method for thermal decomposition of an organic substance which comprises heating the organic substance with the catalyst mentioned above thereby thermally decomposing and gasifying the organic substance.

Preferably the method for thermal decomposition of an organic substance of the invention comprises heating the organic substance with a catalyst with stirring to thermally decompose and gasifying the organic substance, wherein the catalyst comprises the at least one inorganic oxide, and has the form of spherical granule having a particle diameter of 0.1 to 1.2 mm, a pore volume of 0.1 to 0.3 mL/g, a tap density of 1.05 to 1.4 g/mL, and a wear rate of 2% by weight or less, wherein the spherical granule of the inorganic oxide is obtained by mixing and granulating a pulverized product of the inorganic oxide with at least one sol selected from a titania sol, a silica sol, an alumina sol, and a zirconia sol to make spherical granules, calcining the spherical granules at a temperature from 400 to 850° C., and sieving the calcined granules.

The invention further provides a method for production of a catalyst for thermal decomposition of an organic substance which comprises the at least one inorganic oxide, and has the form of spherical granule having a pore volume of 0.1 to 0.3 mL/g, a tap density of 1.05 to 1.4 g/mL, and a wear rate of 2% by weight or less, the method comprising mixing and granulating a pulverized product of the at least one inorganic oxide with at least one sol selected from a titania sol, a silica sol, an alumina sol, and a zirconia sol to make spherical granules, calcining the spherical granules at a temperature from 400 to 850° C., and sieving the calcined granules so that they have a particle diameter from 0.1 to 1.2 mm.

Effect of the Invention

The catalyst for thermal decomposition of an organic substance according to the invention comprises the inorganic oxide above described and has the form of spherical granule having such a particle diameter, a pore volume, and a tap density that are within the range described above, and a wear rate of 2% by weight or less. Thus, when the catalyst is heated under stirring with an organic substance to thermally decompose the organic substance, the catalyst has good flowability and is hardly pulverized, the wearing is minimized, and thus the catalyst can thermally decompose the organic substance efficiently and stably for a long time.

REFERENCE SIGNS LIST

Figure 1:
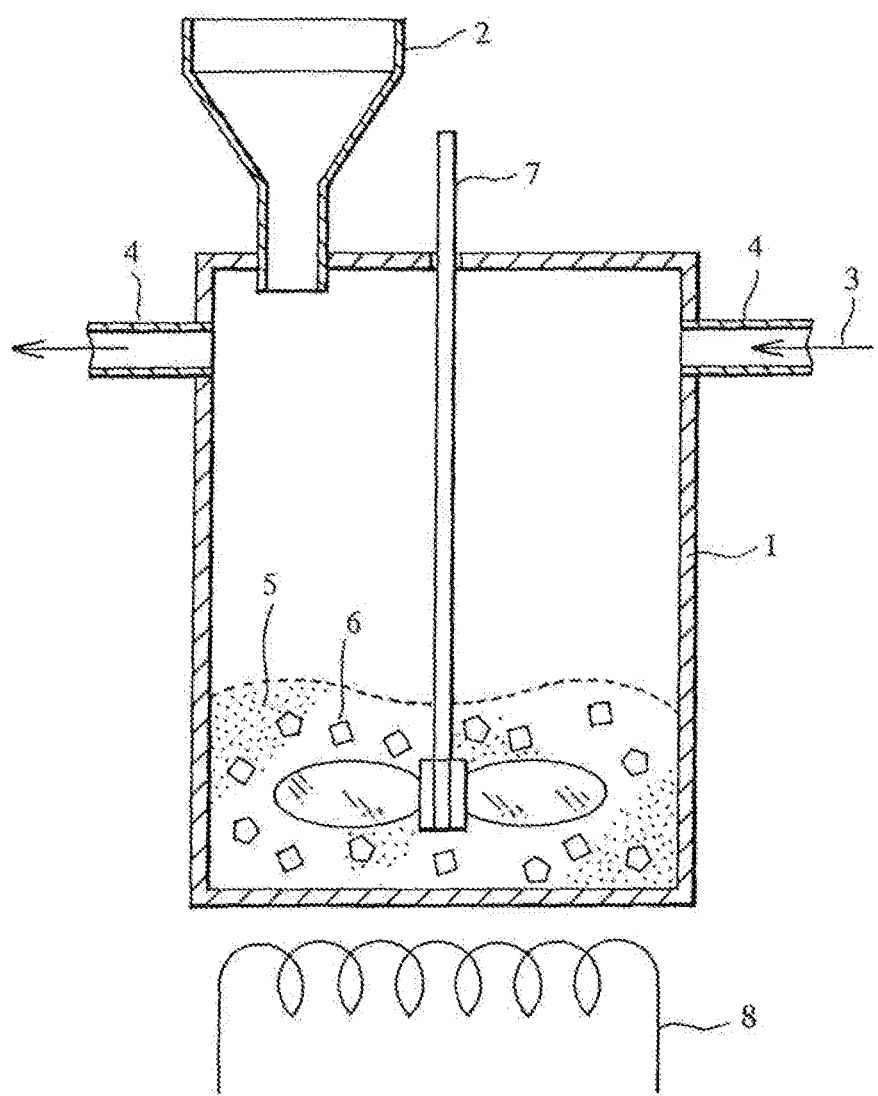
FIG. 1 is a partially sectional view of equipment to evaluate the activity of catalyst according to the invention.

1 . . . Reaction vessel
2 . . . Inlet for putting waste plastic strips into a reaction vessel
3 . . . Carrier gas
4 . . . Carrier gas tube
5 . . . Catalyst for thermal decomposition of organic substance
6 . . . Waste plastic strips
7 . . . Stirrer
8 . . . Heater

BEST MODE FOR CARRYING OUT THE INVENTION

The catalyst for thermal decomposition of an organic substance of the invention comprises at least one inorganic oxide selected from titanium oxide, a titanium/niobium composite oxide, a titanium/silicon composite oxide, a composite oxide of at least one element selected from silicon and tungsten with titanium, a composite oxide of at least one element selected from silicon and molybdenum with titanium, a titanium/aluminum composite oxide, zirconium oxide, a titanium/zirconium composite oxide, and a titanium-containing perovskite compound.

All these inorganic oxides have photocatalytic activity, as is well known. An inorganic oxide having the photocatalytic activity typified by titanium oxide is excited by receiving light energy higher than the band gap it has to emit electrons, and as a result, it has the photocatalytic activity, typically, strong oxidation activity. Such an inorganic oxide having the photocatalytic activity is also excited by thermal energy to emit electrons with temperature rise, and thus exhibits strong oxidation activity. Therefore, the inorganic oxide effectively works as a thermal decomposition catalyst in the same manner as titanium oxide does.

The catalyst for thermal decomposition of an organic substance of the invention comprises the inorganic oxide typified by titanium oxide, and has the form of spherical granule which has a particle diameter of 0.1 to 1.2 mm, a pore volume of 0.1 to 0.3 mL/g, a tap density of 1.05 to 1.4 g/mL, and a wear rate of 2% by weight or less.

According to the invention, that granules have a particle diameter of 0.1 to 1.2 mm means that 100% by weight of the granules have a particle diameter of 0.1 to 1.2 mm. The particle diameter of granules is measured by the method described later.

When the thermal decomposition catalyst in the form of granule contains granules having a particle diameter of less than 0.1 mm, it has good decomposition performance at an initial stage, but the granules are discharged from a thermal decomposition equipment and lost with thermal decomposition gas generated during the thermal decomposition of an organic substance, and thus the thermal decomposition performance is decreased with time. However, when the catalyst contains granules having a particle diameter of more than 1.2 mm, the granules are classified during they are heated in the thermal decomposition equipment under stirring with an organic substance, for example, waste plastic strips, and thus the thermal decomposition performance may be decreased with time. That is to say, the granules are separated into granules having a large particle diameter and granules having a small particle diameter, and become difficult to come into contact with the organic substance efficiently. As a result, the thermal decomposition performance may be decreased.

According to the invention, the granules have a spherical shape and a particle diameter of 0.1 to 1.2 mm, and hence no classification is caused during they work as the catalyst for the thermal decomposition of an organic substance, the granules have good flowability and contact with an organic substance, and thus the catalyst has excellent performance of thermal decomposition of an organic substance.

Further according to the invention, the tap density and the pore volume of the catalyst in the form of spherical granule is within the range described above, and hence the catalyst has better flowability and contact with an organic substance as well as much more hardly pulverized, and the wearing is well suppressed while the catalyst is heated under stirring with an organic substance, for example, waste plastic strips for thermal decomposition of the organic substance. Thus, the catalyst of the invention has excellent thermal decomposition performance on organic substance.

According to the invention, the tap density and the wear rate are measured by the methods described later, and the pore volume is measured by a mercury intrusion method at a maximum pressure of 196.14 MPa.

The catalyst for thermal decomposition of an organic substance according to the invention can be obtained by mixing and granulating a pulverized product of the inorganic oxide with at least one sol selected from a titania sol, a silica sol, an alumina sol, and a zirconia sol to prepare spherical granules, then calcining the resulting spherical granules at a temperature from 400 to 850° C., and then sieving the obtained granules so that they have a particle diameter of 0.1 to 1.2 mm.

Among the inorganic oxides, examples of the titanium-containing perovskite compound include strontium titanate, barium zirconate titanate, and calcium titanate. Additional examples include compounds containing lanthanum, cerium, yttrium, or the like with which some of barium, zirconium, strontium, and/or calcium in the above-exemplified compounds are substituted. However, the titanium-containing perovskite compounds are not limited to them.

According to the invention, however, among the inorganic oxides, titanium oxide, a titanium/tungsten composite oxide, a titanium/silicon composite oxide, a titanium/molybdenum composite oxide, a titanium/niobium composite oxide, and the like are specifically preferably used.

As is well known, the mixing and granulation process is a granulation process in which fine powder (corresponding to fine powder of the inorganic oxide in the invention) and a liquid binder (corresponding to the sol in the invention) are mixed to provide compacted aggregates of fine powder by aggregating the fine powder with the sol and by shearing the fine powder with mixing propellers at high speed. The compressed density and the particle diameter of aggregated granules to be obtained can be appropriately controlled by the amount of a sol used, the rotation speed of the mixing propellers, granulation time, and the like. Furthermore, when a base plate in a granulation vessel of a mixing and granulation apparatus is properly selected, obtained aggregates can have a more spherical shape.

A granulator for carrying out the mixing and granulating process for the inorganic oxide used in the invention is not specifically limited. Preferably used are, for example, Mixer and Granulator (NMG series) manufactured by Nara Machinery Co., Ltd., High Speed Mixer and High Flex Gral manufactured by Fukae Powtec Co., Ltd., Eirich Intensive Mixer (Eirich back-flow high speed mixer) manufactured by Nippon Eirich Co., Ltd., High Speed Mixer and Granulator (HSG series) manufactured by G-LABO, Inc., High Shear Mixer Granulator and Kneader (SPG series) and a high shear mixer granulator Spartan Granulator manufactured by Dalton Co., Ltd., and Vertical Granulator (VG-CT series) manufactured by Powrex Corp.

According to the invention, the granules obtained by the mixing and granulation process may be further granulated by at least one method selected from a tumbling granulation method and a fluidized bed granulation method in the presence of the sol so that the granules obtained by the mixing and granulating process may have more spherical shape and the particle size distribution may be more precise.

When the granules are further granulated as mentioned above, the granules may be granulated with a mixture of the sol with a pulverized product of the inorganic oxide or a pulverized product obtained by drying, calcining and pulverizing the sol so that the resulting granules are much harder and much improved in wear resistance.

As is well known, the tumbling granulation method is a granulation method in which a mixture of fine powder and a liquid binder is applied with tumbling motion to provide aggregated granules. As is also well known, the fluidized bed granulation method is a granulation method in which a fluidized bed of fine powder is supplied with a liquid binder, and crosslinking between the particles are formed through the binder to provide aggregated granules.

In this manner, the inorganic oxide is mixed and granulated, and further granulated by at least one method selected from a tumbling granulation method and a fluidized bed granulation method. Then, the product is calcined at a temperature from 400 to 850° C. as described above, and then granules having a particle diameter of 0.1 to 1.2 mm are collected by sieving. As a result, granules having a required particle diameter can be obtained as the catalyst according to the invention.

A tumbling granulator and a fluidized bed granulator (composite granulator) usable for carrying out such further granulation in the invention are not specifically limited. Examples of the granulator include a fluidized bed granulation apparatus "New Marumerizer (Spheronizer)" and a spherical granulator "Marumerizer" manufactured by Dalton Co., Ltd. and a fluidized bed granulator and a tumbling fluidized bed coating apparatus "Multiplex" series manufactured by Powrex Corp.

An example of equipment for thermal decomposition of an organic substance according to the invention is shown in FIG. 1. A reaction vessel 1 includes an inlet 2 for putting an organic substance, for example, waste plastic strips into the reaction vessel, a carrier gas tube 4 for introducing a carrier gas 3 into the reaction vessel and for discharging a generated thermal decomposition gas from the reaction vessel, and a stirrer 7 for stirring a thermal decomposition catalyst 5 and waste plastic strips 6 in the reaction vessel.

The equipment further includes a heater 8 for heating the thermal decomposition catalyst and the waste plastic strips in the reaction vessel. The heater is placed outside of the reaction vessel in the equipment shown, but it may be placed inside of the reaction vessel. Air is commonly used as the carrier gas, but an inert gas may be used as necessary. However, when waste plastic is thermally decomposed in accordance with the invention, the equipment used is not limited to the embodiment. For example, a rotary kiln or a fluidized bed equipment can be used.

As described above, because the catalyst according to the invention has the photocatalytic activity, when the catalyst is heated under stirring with an organic substance to thermally decompose the organic substance, the catalyst may be heated under stirring with the organic substance under ultraviolet irradiation as necessary.

The thermal decomposition catalyst for an organic substance of the invention comprises the inorganic oxide, and has the form of spherical granule having the predetermined particle characteristics defined by the particle diameter, the pore volume, and the tap density, and further a predetermined wear rate. Thus, even when the catalyst is mixed with and stirred with an organic substance under heat, it can keep the particle characteristics for a long time. Therefore, the thermal decomposition catalyst of the invention can thermally decompose an organic substance in high efficiency for a long time.

An organic substance that can be thermally decomposed with the catalyst of the invention is not specifically limited. Examples of the organic substance include commonly used thermoplastic resins such as polyethylene and polypropylene as well as thermosetting resins and organic substances included in medical waste products, including latex, various plastics such as polyethylene, polypropylene, polyethylene terephthalate, and polyether ether ketone, gauze, and absorbent cotton.

When an organic substance to be thermally decomposed is solid, it is preferably crushed into several millimeters cubes, but the size is not specifically limited.

According to the invention, the temperature at which the thermal decomposition catalyst and an organic substance are heated varies depending on the type of the organic substance, but is at least 200° C., preferably 300° C. or more, and specifically preferably in a range from 400 to 600° C.

EXAMPLES

The invention is described in more detail with reference to the following examples; however, these examples are not to be construed to limit the scope of the invention.

Example 1

A slurry of titanium hydroxide obtained in the hydrolysis step in a process for producing titanium oxide by a sulfuric acid method was filtered, washed with water, and repulped to give a slurry A. Nitric acid was added to the slurry A as a solating agent to give a sol B of titanium oxide. Then, a part of the sol B was heated and dried at 100° C. to give a dried gel. The dried gel was calcined in an electric furnace at 500° C. for 3 hours to give a titanium oxide calcined product C.

The titanium oxide calcined product C was pulverized, and the resulting pulverized product was granulated using High Shear Mixer Granulator SPG-25 manufactured by Dalton Co., Ltd. under conditions of a mixing propeller speed at 250 rpm and a high speed chopper speed at 3000 rpm while spraying the pulverized product with the sol B diluted five times with water to give granules of titanium oxide.

The granules of titanium oxide were dried at 100° C. for 3 hours, then calcined at 600° C., and sieved with sieves having openings of 1.19 mm and 0.104 mm to give 100% by weight of granules having a particle diameter of 0.1 to 1.2 mm.

Herein the invention, the granules having a particle diameter of 0.1 to 1.2 mm are those of 15-mesh undersize and 150-mesh oversize, that is, such granules that they pass through a 15-mesh standard sieve (having a wire diameter of 0.5 mm, an opening of 1.19 mm) made from stainless-steel wire mesh and do not pass through a 150-mesh standard sieve (having a wire diameter of 0.065 mm, an opening of 0.104 mm).

Specifically, the granules having a particle diameter of 0.1 to 1.2 mm were obtained as follows. A 15-mesh standard sieve was attached to a top cover of Ro-tap Standard Sieve Shaker manufactured by Yoshida Seisakusho Co., Ltd., and a 150-mesh standard sieve was attached to a bottom tray. 100 g of granules of titanium oxide were supplied as a sample on the 15-mesh standard sieve, and sieved at a shaking rotation speed of 300 rpm and a hitting number of 150 times/minute for 3 minutes to give granules having a particle diameter of 0.1 to 1.2 mm as the 15-mesh undersize and the 150-mesh oversize.

The granules of titanium oxide obtained in this manner had a specific surface area of 60 $m^2/g$ as measured by a BET method, a pore volume of 0.15 mL/g as measured by a mercury intrusion method, and a tap density of 1.16 g/mL. The wear rate was 0.3%.

The tap density of granules was determined as follows. About 180 g of granules were put in a 200-mL glass graduated cylinder. The graduated cylinder was dropped ten times repeatedly under gravity from a height of 50 mm onto a rubber sheet having a thickness of 10 mm, and then hit ten times from a distance of 50 mm against a side face of a wooden plate. This operation was repeated twice, and then a scale on the graduated cylinder was read to determine the volume V (mL) of the granules. Separately, the granules were dried at 110° C. for 3 hours and then weighed the weight M (g). The tap density was calculated from the formula M/V.

Figure 2:
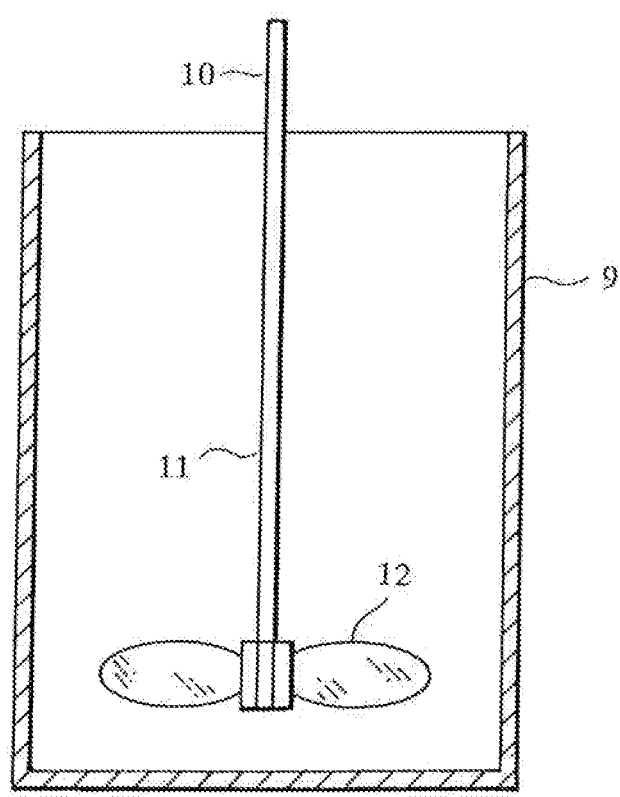
FIG. 2 is a view of equipment to measure the wear of catalyst.

The wear rate of granules was determined with a wear rate measuring equipment shown in FIG. 2. The wear rate measuring equipment includes a sample vessel 9 having an inner diameter of 63 mm and a depth of 86 mm and equipped with a stirrer 10. The stirrer includes an axis 11 having a lower end to which three elliptical mixing propellers 12 each having a length of 20 mm were attached at intervals of 60° extending from the axis in the diameter direction. Each mixing propeller was tilted so as to have an angle of 45° with respect to the horizontal. The lowest end of each mixing propeller was placed at a distance of 8 mm from the bottom of the sample vessel.

The wear rate of granules was determining as follows. 150 mL of granules were measured with a 200-mL graduated cylinder to record the weight, and then, all of the granules were put in the sample vessel and stirred at 300 rpm for 30 minutes using the stirrer. Then, the sample was discharged from the sample vessel, the entire sample was transferred onto a sieve having an opening of 0.104 mm, and the sample passed through the sieve was weighed. The wear rate A of the sample is represented by $A=(W/W_0)\times 100(\%)$ where the weight of the sample passed through the sieve having an opening of 0.104 mm is W and the weight of the sample subjected to the measurement is $W_0$.

Using a thermal decomposition equipment including a 500 mL beaker equipped with a stirrer and a heater, 50 g of the granules of titanium oxide obtained above and 50 g of polyethylene resin that was crushed into about 5 mm cubes were placed into the beaker, and heated to 400° C. with stirring. As a result, the time needed to thermally decompose and completely gasify the polyethylene resin was 9 minutes.

Example 2

The slurry A of the titanium hydroxide obtained in Example 1 was heated and dried at 100° C. to give a dried gel. The dried gel was calcined in an electric furnace at 500° C. for 3 hours, and then pulverized to give a pulverized product of the titanium oxide calcined product D. Then, 50 parts by weight of the pulverized product of the titanium oxide calcined product D was mixed with 50 parts by weight of the pulverized product of the titanium oxide calcined product C.

A mixture of 50 parts by weight of the pulverized product of the titanium oxide calcined product D and 50 parts by weight of the pulverized product of the titanium oxide calcined product C was treated in the same manner as that in Example 1, and the obtained granules were dried, calcined, and sieved to give granules having a particle diameter of 0.1 to 1.2 mm.

The granules of titanium oxide obtained in this manner had a specific surface area of 62 $m^2/g$, a pore volume of 0.28 mL/g, a tap density of 1.06 g/mL, and a wear rate of 1.0%.

Thermal decomposition of polyethylene resin was carried out using the granules of titanium oxide obtained above as a thermal decomposition catalyst in the same manner as in Example 1. As a result, the time needed to thermally decompose and completely gasify the polyethylene resin was 7 minutes.

Example 3

The granules of the titanium oxide obtained in Example 1 were further granulated so as to have a more spherical shape using with a tumbling granulator "Marumerizer" while spraying the granules of the titanium oxide with a mixture of the pulverized product of titanium oxide C obtained in Example 1 and the sol B diluted four times with water. The obtained granules were treated in the same manner as that in Example 1 to give granules having a particle diameter of 0.1 to 1.2 mm. The granules of titanium oxide had a specific surface area of 59 $m^2$/g, a pore volume of 0.17 mL/g, a tap density of 1.18 g/mL, and a wear rate of 0.3%.

Thermal decomposition of polyethylene resin was carried out using the granules of titanium oxide obtained above as a thermal decomposition catalyst in the same manner as in Example 1. As a result, the time needed to thermally decompose and completely gasify the polyethylene resin was 8 minutes.

Example 4

The sol B of titanium oxide obtained in Example 1 was mixed with ammonium tungstate. The mixture was heated and dried at 100° C. to give a dried gel. The dried gel was calcined in an electric furnace at 500° C. for 3 hours to give a calcined product of a titanium/tungsten composite oxide (having a weight ratio of titanium oxide/tungsten oxide of 90:10).

The calcined product of the titanium/tungsten composite oxide E was pulverized to give a pulverized product. The pulverized product was granulated using High Shear Mixer Granulator SPG-25 manufactured by Dalton Co., Ltd. under conditions of a mixing propeller speed at 250 rpm and a high speed chopper speed at 3000 rpm while spraying the pulverized product with the sol B diluted five times with water to give titanium/tungsten composite oxide granules.

The granules were then further granulated so as to have a more spherical shape using a spherical granulator "Marumerizer" while spraying the granules with the pulverized product of the calcined product of the titanium/tungsten composite oxide E and the sol B diluted four times with water. The obtained granules were treated in the same manner as that in Example 1 to give granules having a particle diameter of 0.1 to 1.2 mm.

The granules had a specific surface area of 69 $m^2$/g, a pore volume of 0.2 mL/g, a tap density of 1.20 g/mL, and a wear rate of 0.5%.

Thermal decomposition of polyethylene resin was carried out using the granules as a thermal decomposition catalyst in the same manner as in Example 1. As a result, the time needed to thermally decompose and completely gasify the polyethylene resin was 5 minutes.

Comparative Example 1

In the same manner as that in Example 1, granules of titanium oxide having a particle diameter of not less than 1.2 mm were obtained. Thermal decomposition of polyethylene resin was carried out using the granules as a thermal decomposition catalyst in the same manner as in Example 1. As a result, the time needed to thermally decompose and completely gasify the polyethylene resin was 16 minutes.

Comparative Example 2

In the same manner as that in Example 1, granules of titanium oxide having a particle diameter of not more than 0.1 mm were obtained. Thermal decomposition of polyethylene resin was carried out using the granules as a thermal decomposition catalyst in the same manner as in Example 1. As a result, the time needed to thermally decompose and completely gasify the polyethylene resin was 10 minutes. After testing the catalyst performance as above, the weight of granules remained in the equipment was 40 g while the initial weight of 50 g.

Comparative Example 3

The granules of titanium oxide obtained in Example 1 was sieved to prepare granules having a diameter of not more than 0.1 mm and granules having a diameter from 0.1 mm to 0.5 mm. A mixture was prepared by mixing 20% by weight of the former and 80% by weight of the latter.

Separately in the same manner as Example 3, a part of the granules of titanium oxide having a particle diameter from 0.1 mm to 0.5 mm was further granulated so as to have a more spherical shape using a tumbling granulator "Marumerizer" while spraying the granules of titanium oxide with a mixture of the pulverized product of titanium oxide C obtained in Example 1 and the sol B diluted four times with water. The obtained granules were sieved and a mixture was prepared by mixing 40% by weight of granules having a particle diameter from 0.5 mm to 1.2 mm and 60% by weight of granules having a particle diameter from 1.2 mm to 2.18 mm Using the granules of titanium oxide classified as mentioned above, a mixture of granules composed of 20% by weight of granules having a particle diameter of not more than 0.1 mm, 50% by weight of granules having a particle diameter from not less than 0.1 mm to not more than 1.2 mm, and 30% by weight of granules having a particle diameter of not less than 1.2 mm to not more than 2.18 mm. The granules of titanium oxide thus obtained had a specific surface area of 62 $m^2$/g, a pore volume of 0.16 mL/g, a tap density of 1.20 g/mL.

Thermal decomposition of polyethylene resin was carried out using the granules of titanium oxide obtained above as a thermal decomposition catalyst in the same manner as in Example 1. As a result, the time needed to thermally decompose and completely gasify the polyethylene resin was 15 minutes.

After the thermal decomposition, when the layer of granules remained in the equipment were observed to find that granules having a large particle diameter were unevenly distributed in the upper part of the layer, being separated from granules having a small particle diameter.

Comparative Example 4

The slurry A of titanium hydroxide was heated and dried at 100° C., calcined in an electric furnace at 500° C. for 3 hours, and then pulverized to give a pulverized product of the titanium oxide calcined product D. Then, 70 parts by weight of the pulverized product of the titanium oxide calcined product D was mixed with 30 parts by weight of the pulverized product of the titanium oxide calcined product C. 15 parts by weight of melamine resin were added as a pore forming agent to 100 parts by weight of the resulting mixture in order that the resulting catalyst has an increased pore volume, and hence an improved thermal decomposition performance.

The mixture of pulverized product of titanium oxide and melamine resin was granulated using High Shear Mixer Granulator SPG 25 manufactured by Dalton Co., Ltd. under conditions of a mixing propeller speed at 250 rpm and a high speed chopper speed at 3000 rpm while spraying the mixture with the sol B diluted five times with water to give granules of titanium oxide.

The granules of titanium oxide were dried at 100° C. for three hours, and calcined at 600° C., and then sieved using sieves having openings of 1.19 mm and 0.104 mm to give granules having a particle diameter from 0.1 mm to 1.2 mm. The granules of titanium oxide thus obtained had a specific surface area of 62 m²/g, a pore volume of 0.33 mL/g, a tap density of 1.01 g/mL, and a wear rate of 3.5%.

Thermal decomposition of polyethylene resin was carried out using the granules of titanium oxide obtained above as a thermal decomposition catalyst in the same manner as in Example 1. As a result, the time needed to thermally decompose and completely gasify the polyethylene resin was 12 minutes. After testing the catalyst performance as above, the weight of granules remained in the equipment was 38 g while the initial weight was 50 g.

Comparative Example 5

The granules of titanium oxide obtained in Example 3 was immersed in the sol B diluted four times with water, dried, immersed in the sol again, dried, and then calcined in an electric furnace at 450° C. The calcined product was then sieved in the same manner as mentioned above to prepare granules having a particle diameter of 0.1 to 1.2 mm. The granules of titanium oxide thus obtained had a specific surface area of 66 m²/g, a pore volume of 0.08 mL/g as measured by a mercury intrusion method, and a tap density of 1.17 g/mL. The wear rate was 0.4%.

Thermal decomposition of polyethylene resin was carried out using the granules of titanium oxide obtained above as a thermal decomposition catalyst in the same manner as in Example 1. As a result, the time needed to thermally decompose and completely gasify the polyethylene resin was 15 minutes.

Comparative Example 6

Pulverized powder of alumina was granulated using High Shear Mixer Granulator SPG-25 manufactured by Dalton Co., Ltd. under conditions of a mixing propeller speed at 250 rpm and a high speed chopper speed at 3000 rpm while spraying the pulverized powder of alumina with an alumina sol diluted five times with water to give granules of alumina.

The granules of alumina were dried at 100° C. for 3 hours, calcined in an electric furnace at 600° C., and then sieved using sieves having openings of 1.19 mm and 0.104 mm to give granules of alumina having a particle diameter of 0.1 to 1.2 mm.

Thermal decomposition of polyethylene resin was tried in vain using the granules of alumina obtained above as a thermal decomposition catalyst in the same manner as in Example 1. No decomposition of polyethylene resin took place.

The invention claimed is:

1. A catalyst for thermal decomposition of an organic substance, consisting of
   a plurality of particles consisting of a composite oxide of tungsten with titanium and a product of a sol,
      wherein the sol is used as a binder when a mixture of the composite oxide and the sol is granulated,
   wherein the particles have the form of a spherical granule having a particle diameter of 0.1 to 1.2 mm, a pore volume of 0.1 to 0.3 mL/g, a tap density of 1.05 to 1.4 g/mL, and a wear rate of 2% by weight or less.

2. A catalyst for thermal decomposition of an organic substance, consisting of
   a plurality of particles consisting of a composite oxide of tungsten with titanium,
   wherein the particles have the form of a spherical granule having a particle diameter of 0.1 to 1.2 mm, a pore volume of 0.1 to 0.3 mL/g, a tap density of 1.05 to 1.4 g/mL, and a wear rate of 2% by weight or less,
   wherein the particles having the form of a spherical granule are obtained by
      mixing and granulating a pulverized product of the composite oxide of tungsten with titanium with at least one sol selected from a titania sol, a silica sol, an alumina sol, and a zirconia sol to make spherical granules,
      calcining the spherical granules at a temperature of 400-850° C. to make calcined granules, and
      sieving the calcined granules.

3. A catalyst for thermal decomposition and gasification of an organic substance by heating the organic substance with the catalyst with stirring, consisting of
   a plurality of particles consisting of a composite oxide of tungsten with titanium,
   wherein particles have the form of a spherical granule having a particle diameter of 0.1 to 1.2 mm, a pore volume of 0.1 to 0.3 mL/g, a tap density of 1.05 to 1.4 g/mL, and a wear rate of 2% by weight or less,
   wherein the particles having the form of a spherical granule are obtained by
      mixing and granulating a pulverized product of the composite oxide of tungsten with titanium with at least one sol selected from a titania sol, a silica sol, an alumina sol, and a zirconia sol to make spherical granules,
      calcining the spherical granules at a temperature of 400-850° C. to make calcined granules, and
      sieving the calcined granules.

4. The catalyst for thermal decomposition of an organic substance according to claim 2, which is obtained by
   mixing and granulating a pulverized product of the composite oxide of tungsten with titanium with at least one sol selected from a titania sol, a silica sol, an alumina sol, and a zirconia sol to make spherical granules,
   further granulating the spherical granules with the at least one sol containing a pulverized product of the composite oxide of tungsten with titanium by at least one method selected from a tumbling granulation method and a fluidized bed granulation method to make resulting granules,
   calcining the resulting granules at a temperature of 400-850° C. to make calcined granules, and
   sieving the calcined granules.

5. The catalyst for thermal decomposition of an organic substance according to claim 1, wherein the organic substance is waste plastic.

6. The catalyst for thermal decomposition of an organic substance according to claim 1, wherein the organic substance is medical waste.

* * * * *